United States Patent [19]

Sasaki et al.

[11] Patent Number: 5,539,972
[45] Date of Patent: Jul. 30, 1996

[54] METHOD OF SCREWING A PIPE TO AN OBJECT

[75] Inventors: Takao Sasaki, Hachioji; Toshiaki Otsuki; Ryouji Eguchi, both of Yamanashi, all of Japan

[73] Assignee: Fanuc Ltd., Yamanashi, Japan

[21] Appl. No.: 430,319

[22] Filed: Apr. 28, 1995

Related U.S. Application Data

[63] Continuation of Ser. No. 137,034, Oct. 18, 1993, abandoned.

[30] Foreign Application Priority Data

Mar. 5, 1992 [JP] Japan .................................. 4-048675

[51] Int. Cl.⁶ .................................................. B23P 19/00
[52] U.S. Cl. .............................................. 29/456; 29/240.5
[58] Field of Search .................................. 29/240, 240.5, 29/435, 456–525, 517; 403/43, 48; 285/34, 219, 390

[56] References Cited

U.S. PATENT DOCUMENTS

| | | | |
|---|---|---|---|
| 3,137,186 | 6/1964 | Rosan et al. | 29/240.5 |
| 3,152,495 | 10/1964 | Neuschotz | 29/240.5 X |
| 3,254,690 | 6/1966 | Neuschotz | 29/456 |
| 3,481,022 | 12/1969 | Neuschotz | 29/456 |

FOREIGN PATENT DOCUMENTS

| | | | |
|---|---|---|---|
| 49-119283 | 11/1974 | Japan . | |
| 52-6518 | 2/1977 | Japan . | |
| 404135131 | 5/1992 | Japan | 29/456 |
| 405008135 | 1/1993 | Japan | 29/456 |

*Primary Examiner*—Peter Vo
*Assistant Examiner*—Khan V. Nguyen
*Attorney, Agent, or Firm*—Staas & Halsey

[57] ABSTRACT

Disclosed is a method of screwing a pipe having threads with a different pitch on the outside and inside thereof into an object and assembling the same thereto by using a CNC machine tool. A male thread provided to a spindle is moved to an initial point I and point R by a quick traverse and then moved downward from the point R at a given speed and RPM. More specifically, a pipe is screwed into the object in accordance with the pitch of the thread on the outside thereof and assembled to a female thread of the object. When the male thread reaches a point Z and the pipe is assembled to the female thread of the object, the male thread is moved upward to the point R at a given speed and RPM. More specifically, the male thread is relieved from the pipe in accordance with the pitch of the thread on the inside of the pipe. Only the male thread is moved upward by the movement thereof to enable the pipe to remain engaged with the female thread, whereby the assembly of the pipe to the object is completed.

6 Claims, 6 Drawing Sheets

METHOD OF SCREWING A PIPE TO AN OBJECT

This application is a continuation of application Ser. No. 08/137,034, filed Oct. 18, 1993, now abandoned.

BACKGROUND OF THE INVENTION

1. Field of the Invention

The present invention relates to a screw method executed by a numerical control apparatus, and more specifically, to a screw method for screwing a pipe having threads with a different lead on the outside and inside thereof into an object and assembling the same thereto.

2. Description of the Related Art

When a device is assembled, there is a case in which a pipe having threads with a different pitch on the outside and inside thereof must be assembled to an object. In this case, a method making use of a rigid tapping cycle and a rigid reverse taping cycle performed by a numerical control (CNC) machine tool may be employed. For example, the inside of the pipe is screwed into the male thread of a spindle of the CNC machine tool and first the outside of the pipe is screwed into the object by controlling the operation of the spindle and a feed axis by the rigid tapping cycle. After the completion of the screw operation, the spindle is relieved from the inside of the pipe by controlling the operation of the spindle and feed axis by the rigid reverse tapping cycle. Note, the rigid tapping cycle and rigid reverse tapping cycle refer to a tap machining control by which the rotation of the spindle is synchronized with the feed effected by the feed axis at all times by interpolating the spindle and feed axis.

In the rigid tapping cycle and rigid reverse tapping cycle of the CNC machine tool, an amount of feed of the feed axis per one revolution of the spindle is set equal to the pitch (lead) of the screw of a tap. As a result, the feed speed in the rigid tapping cycle (in a screw operation) is equal to the feed speed in the rigid reverse tapping cycle (in a relief operation). Consequently, when a pipe is screwed into an object and assembled thereto, if the outside and inside of the pipe have the same thread pitch, the rigid tapping cycle and rigid reverse tapping cycle of a CNC machine tool can be effectively used.

Nevertheless, when the outside and inside of the pipe have a different thread pitch, a feed speed must be changed in accordance with the pitch in a screw operation and relief operation, and thus the rigid tapping cycle and rigid reverse tapping cycle with the same feed speed as described above cannot be used. Therefore, when a pipe having threads with a different pitch on the outside and inside thereof is screwed into an object and assembled thereto, a CNC machine tool cannot be used and a dedicated machine must be used. Consequently, an operation process cannot be automatically carried out and thus an operation efficiency is deteriorated.

SUMMARY OF THE INVENTION

Taking the above into consideration, an object of the present invention is to provide a screw method by which an operation can be executed to screw a pipe having threads with a different pitch on the outside and inside thereof to an object and assemble the same thereto by using a CNC machine tool.

To attain the above object, according to the present invention, there is provided a method for screwing a pipe having threads with a different pitch on the outside and inside thereof to an object and assembling thereto, which comprises the steps of mounting the pipe to a spindle, screwing the pipe into the object in accordance with the pitch of the thread on the outside of the pipe and relieving the spindle from the pipe in accordance with the pitch of the thread on the inside of the pipe.

First, the pipe is mounted to the spindle by screwing the inside of the pipe over the male thread of the spindle. Next, the outside of the pipe is screwed into the female thread of the object by rotating the spindle and feeding the spindle by a feed axis. This screw operation is executed in accordance with the pitch of the thread on the outside of the pipe. On the completion of the screw operation of the pipe, the spindle is relieved from the pipe. This relief operation is executed in accordance with the pitch of the thread on the inside of the pipe. As a result, the pipe is engaged with and assembled to the female thread of the object. As described above, a pipe having threads with a different pitch on the outside and inside thereof can be assembled to an object by using the spindle and feed axis of a CNC machine tool. Consequently, an operation process can be automatically carried out and an operation efficiency can be improved.

DETAILED DESCRIPTION OF THE PREFERRED EMBODIMENT

A preferred embodiment of the present invention will be described below with reference to the drawings.

Figure 2:
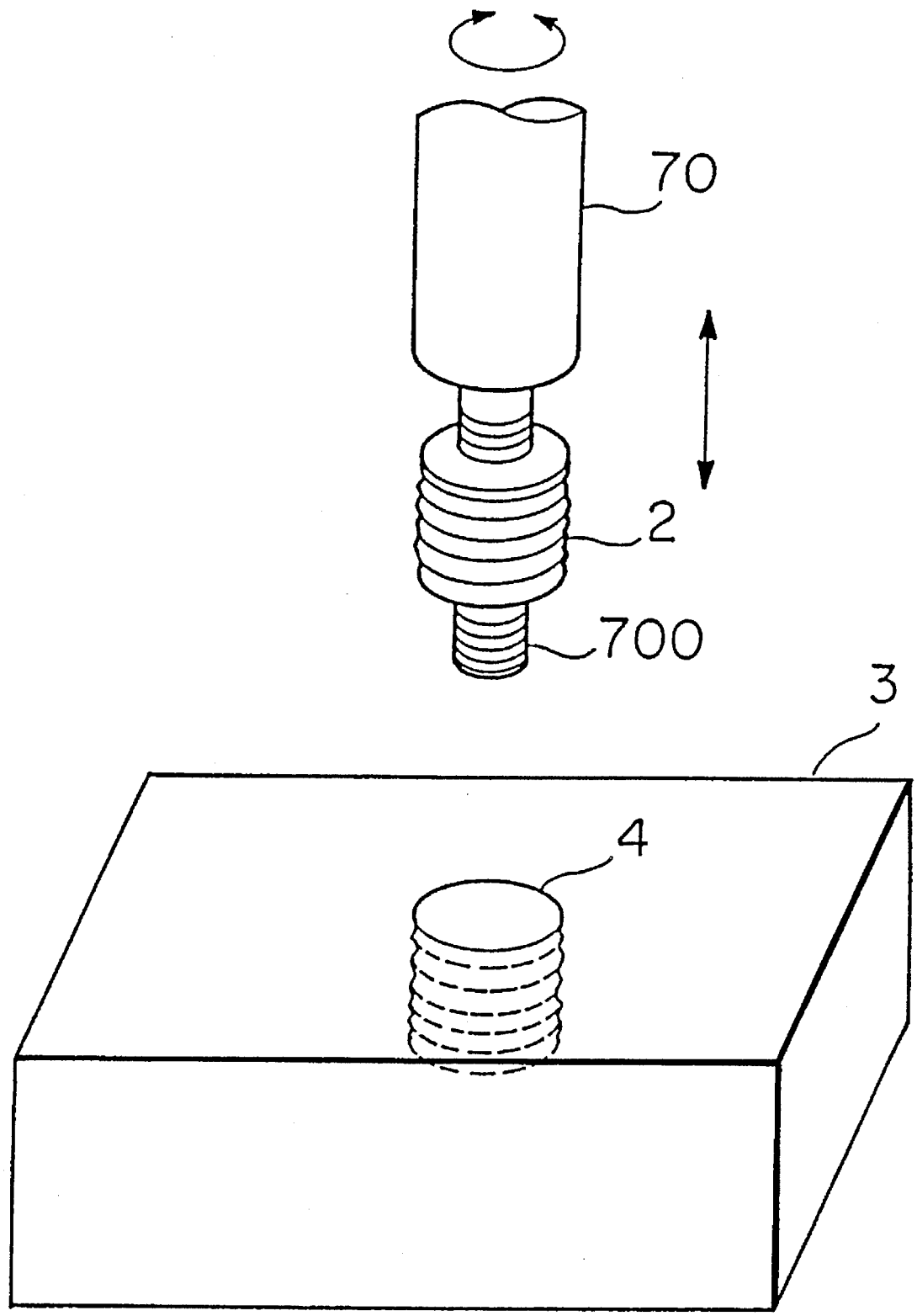
FIG. 2 is a diagram explaining an operation for screwing and assembling a pipe in accordance with a preferred embodiment of the present invention.

FIG. 2 is a diagram used to explain an operation for screwing and assembling a pipe, wherein a pipe 2 has threads with a different pitch (lead) on the outside and inside thereof. Further, a CNC machine tool has a spindle 70 provided with a male thread 700 at the extreme end thereof and the male thread 700 has the same pitch as that of the thread on the inside of the pipe 2. On the other hand, an object 3 has a female thread 4 having the same pitch as that of the thread on the outside of the pipe 2. The pipe 2 is mounted and fixed to the male thread 700 of the spindle 70 and then screwed into the female thread 4 of the object 3 and assembled thereto by the rotation of the spindle 70 and the feed of a not shown feed axis (Z-axis).

Figure 1:
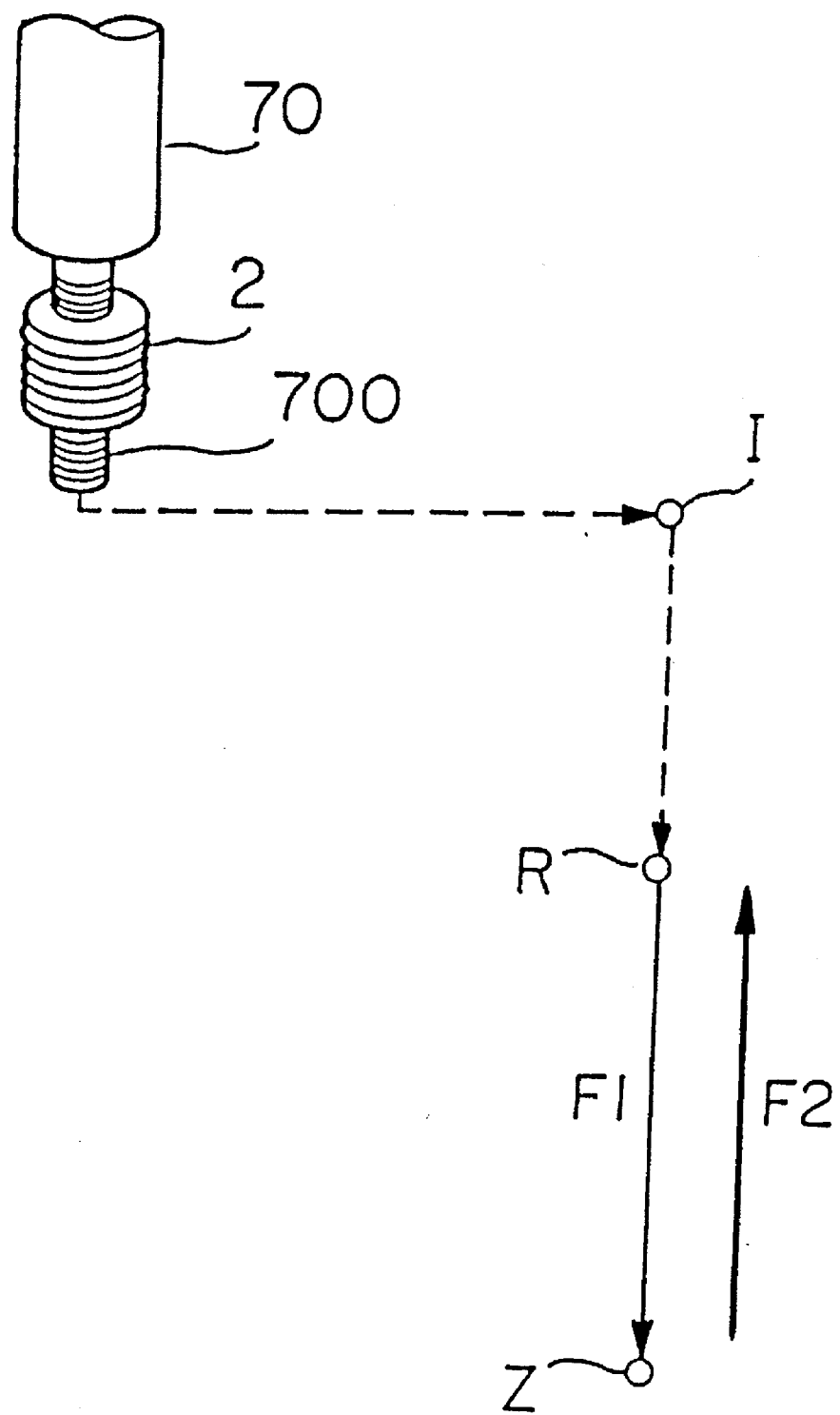
FIG. 1 is a diagram explaining a screw method in accordance with a preferred embodiment of the present invention.

FIG. 1 is a diagram used to explain a screw method in accordance with the present invention, wherein the male thread 700 formed to the spindle 70 operates in accordance with a G code. The G code is made by adding a feed speed command when the Z-axis is relieved to a rigid tapping command G code.

First, the male thread 700 is quickly traversed to an initial point I and then quickly traversed downward from the initial point I to a point R. The point R is set by considering to provide a clearance slightly above the object 3. The male thread 700 is moved downward from the point R at a given feed speed and RPM. More specifically, the pipe 2 is screwed into the object 3 in accordance with the pitch of the thread on the outside of the pipe 2 so that the pipe 2 is assembled to the female thread 4 of the object 3. At this time, the Z-axis as the feed axis for feeding the male thread 700 and the spindle 70 are interpolated by a CNC 10 (FIG. 5) so that they are correctly synchronized and the screw operation is carried out to satisfy the relationship of the following formula (1).

$$F1 = P1\ S \quad (1)$$

where,

F1: feed speed of the Z-axis in the screw operation (mm/min)

P1: pitch of the thread on the outside of the pipe 2 (mm)

S: RPM of the spindle 70 (rpm)

When the male thread 700 reaches a point Z and the pipe 2 is assembled to the female thread 4 of the object 3, the male thread 700 is moved upward to the point R at a given feed speed and RPM. More specifically, the male thread 700 is relieved from the pipe 2 in accordance with the pitch of the thread on the inside of the pipe 2. This relief (escape) operation is carried out to satisfy the relationship of the following formula (2) in the same way as the aforesaid screw operation.

$$F2 = P2\ S \quad (2)$$

where,

F2: feed speed of the Z-axis in the relief operation (mm/min)

P2: pitch of the thread on the inside of the pipe 2 (mm)

S: RPM of the spindle 70, with the rotational direction at this time opposite to that in the screw operation Only the male thread 700 is moved upward by the operation thereof and the pipe 2 remains engaged with the female thread 4, and thus the assembly of the pipe 2 to the object 3 is completed.

Figure 3:
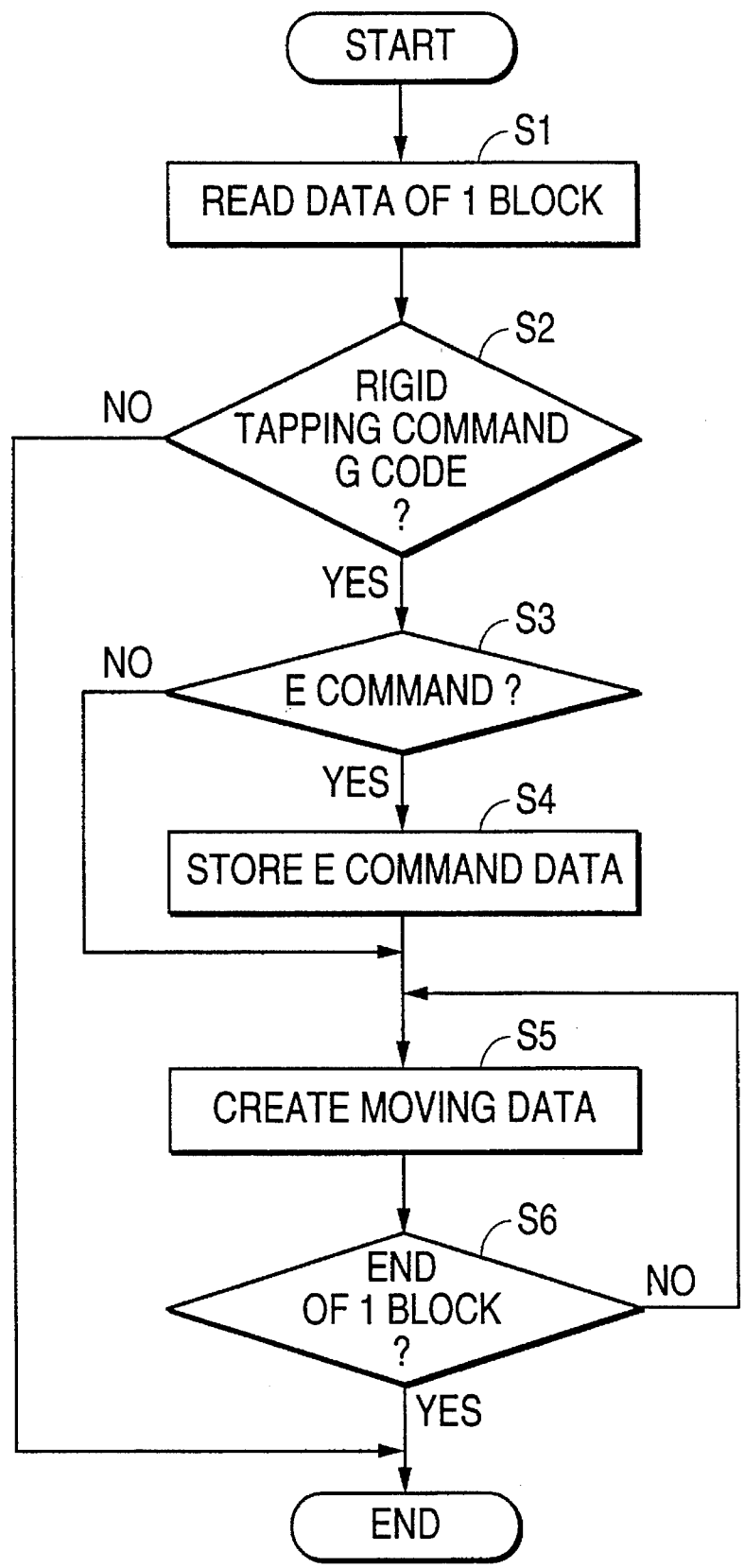
FIG. 3 is a flowchart illustrating a process for executing the screw in accordance with a preferred embodiment of the present invention.

FIG. 3 is a first flowchart for executing the screw method of the present invention, wherein numerals prefixed with an "S" indicate the numbers of steps of the process.

[S1] Data of a block is read in.

[S2] It is determined whether or not the block is a rigid tapping command G code. If so, the flow goes to step 3, and if not so, the program is ended as it is.

[S3] It is determined whether or not the G code is added with a feed speed command (E command) in the relief operation of the Z-axis. If it is added, the flow goes to step S4, and if it is not added, the flow skips to step S5. As described above, the feed speed command of the Z-axis in the relief operation thereof can be changed by the addition of this feed speed command with the conventional rigid tapping command G code.

[S4] The feed speed command (E command) of the Z-axis in the relief operation thereof is stored.

Figure 4:
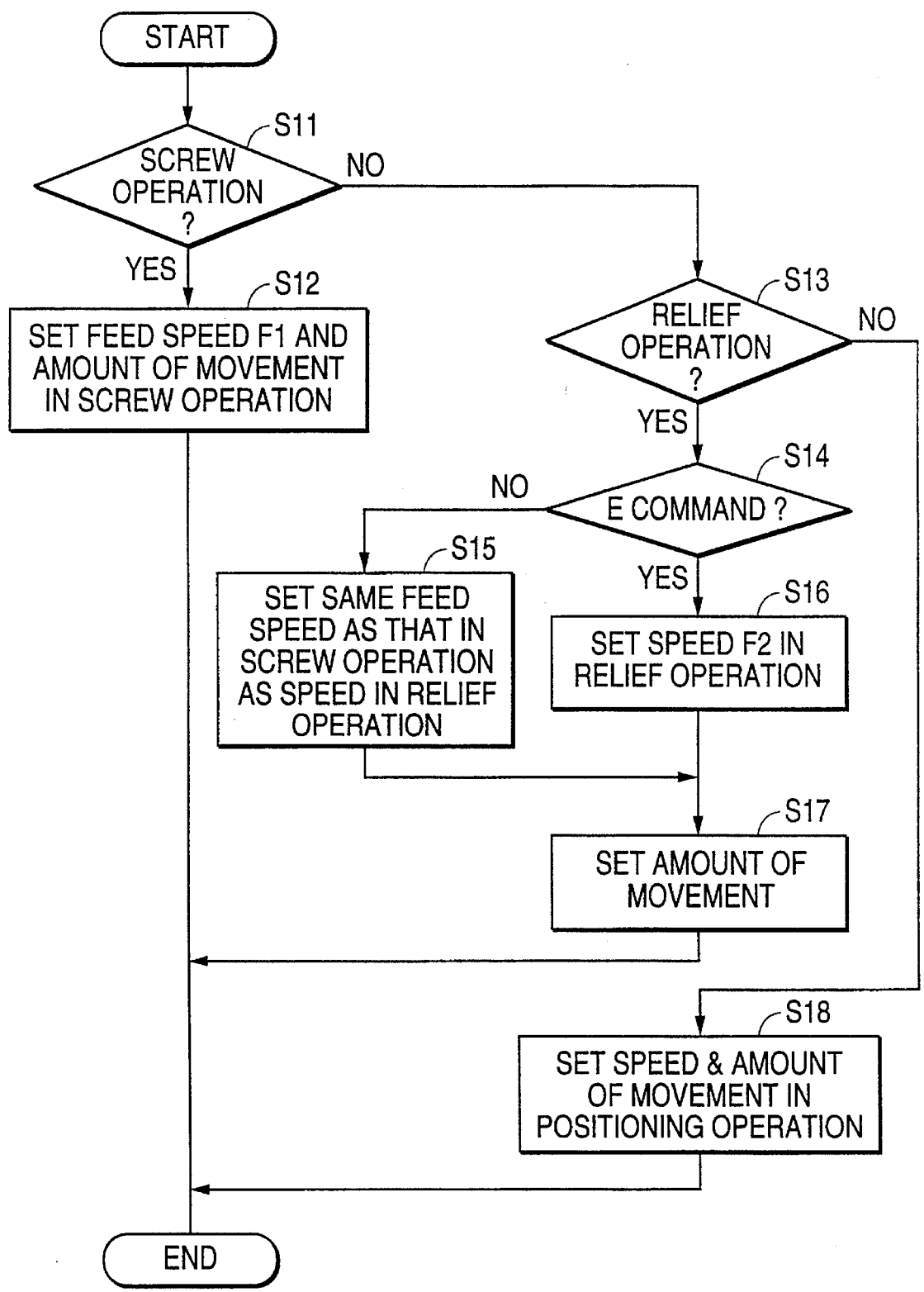
FIG. 4 is a flowchart illustrating a process for executing the screw method in accordance with a preferred embodiment of the present invention.

[S5] The moving data creation loop shown in FIG. 4 is executed.

[S6] It is determined whether the block is ended or not. If the block is finished, the program is finished as it is, and if the block is not finished, the flow returns to step S5.

FIG. 4 is a second flowchart for executing the screw method in accordance with a preferred embodiment of the present invention. This flowchart is used to illustrate the moving data creation loop (step S5 of FIG. 3).

[S11] It is determined whether a screw operation is to be executed or not, and if so, the flow goes to step 12, and if not so, the flow goes to step 13, respectively.

[S12] A feed speed F1 and an amount of movement (an amount of feed) in the screw operation are set.

[S13] It is determined whether a relief operation is to be executed or not, and if so, the flow goes to step 14, and if not so, the flow goes to step 18, respectively.

[S14] Whether or not there is the feed speed command (E command) in the relief operation of the Z-axis is determined, and if there is the feed speed command (E command), the flow goes to step 16, and if there is not the feed speed command, the flow goes to step 15, respectively.

[S15] The same feed speed command as that in the screw operation is set as the feed speed command in the relief operation.

[S16] A feed speed F2 in the relief operation is set in accordance with the feed speed command (E command) in the relief operation of the Z-axis.

[S17] An amount of movement is set.

[S18] A feed speed and an amount of movement of the quick traverse operation (positioning operation) from, for example, the initial point I to the point R are set.

As described above, in accordance with a preferred embodiment of the present invention, when pipe 2 having the threads with a different pitch on the outside and inside thereof is screwed into the female thread 4 of the object 3, the spindle 70 is operated in accordance with the pitch of the thread on the outside of the pipe 2 in the screw operation so that the pipe 2 is screwed into the female thread 4, and further the spindle 70 is operated in accordance with the pitch of the thread on the inside of the pipe 2 in the relief operation so that the spindle 70 is moved upward. With the feed operation and relief operation of the spindle 70, the pipe 2 is engaged with the female thread 4 of the object 3 and assembled thereto. More specifically, the pipe 2 having threads with a different pitch on the outside and inside thereof can be assembled to the object 3 by using a CNC machine tool. As a result, a screw and assembly operation conventionally carried out by using a dedicated machine can be executed by using the CNC machine tool, by which an operation process can be carried out automatically and further an operation efficiency can be improved.

Although in the preferred embodiment described above the arrangement is one in which the pipe 2 is screwed into the female thread 4 of the object 3, the following arrangement may be employed to the case in which the object 3 is provided with a male thread and the pipe 2 is screwed over the male thread. That is, first, the spindle 70 is provided at the extreme end thereof with a female thread having the same pitch as that of the thread on the outside of the pipe 2 and the pipe 2 is mounted and fixed to the spindle by screwing the female thread into the thread on the outside of the pipe 2. Next, the pipe 2 is screwed over the male thread of the object 3 in accordance with the pitch of the thread on the inside of the pipe 2 and fixed thereto. When the pipe 2 is assembled to the male thread of the object 3, the female thread of the spindle 70 is moved upward in accordance with the pitch on the outside of the pipe 2. As a result, the pipe 2 remains engaged with the male thread of the object 3 and thus the assembly of the pipe 2 to the object 3 is completed. As described above, a CNC machine tool also can be used when the pipe 2 is assembled to the male thread of the object 3.

Figure 5:
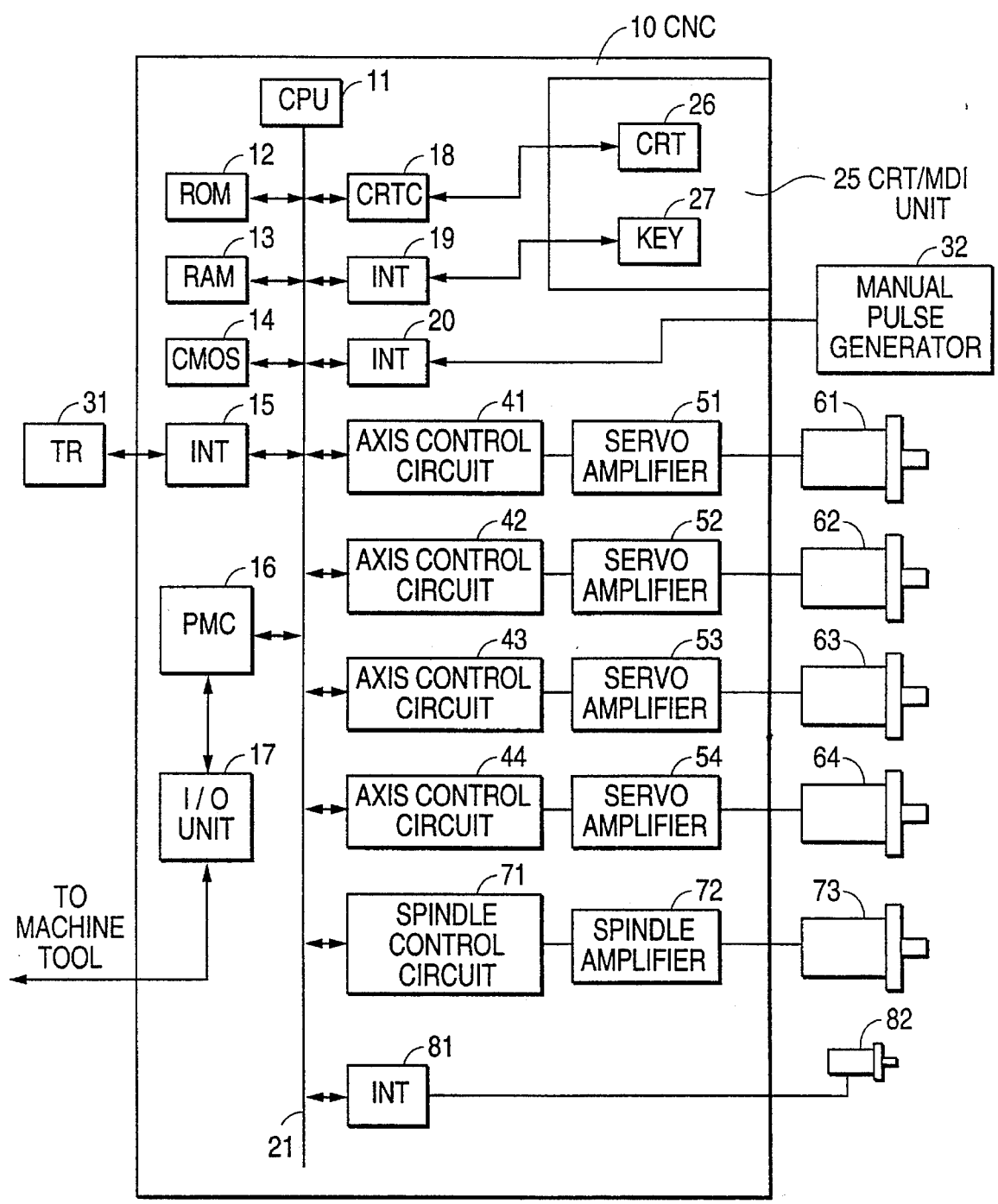
FIG. 5 is a block diagram showing a numerical control apparatus (CNC) used in accordance with a preferred embodiment of the present invention.

FIG. 5 is a block diagram of the hardware of a computerized numerical control apparatus (CNC) embodying the present invention, wherein numeral 10 designates the computerized numerical control apparatus (CNC). A processor 11, which controls the computerized numerical control apparatus 10 as a whole, reads out a system program stored in a ROM 12 through a bus 21, and controls the CNC 10 as a whole according to the system program. A RAM 13 stores temporary calculation data, display data and the like and is composed of an SRAM. A CMOS 14 stores rigid tapping command data, feed speed command data when the Z-axis is relieved, and the like. Further, the CMOS 14 stores the program for the screw method of the present invention, other machining programs, various parameters and the like. These data are maintained as they are even after a power supply to the CNC 10 is cut off, because the CMOS 14 is a non-volatile memory supplied with power from a not shown battery.

An interface 15 used for an external device is connected to an external device 31 such as a paper tape reader, paper tape puncher, paper tape reader/puncher and the like. A machining program is read in from the paper tape reader and a machining program edited in the CNC 10 can be output to the paper tape puncher.

A programmable machine controller (PMC) 16 is incorporated in the CNC 10 and controls a machine tool according to a sequence program created in a ladder form. More specifically, the PMC 16 converts an M function, S function and T function commanded by a machining program into signals needed by the machine tool through the sequence program in accordance with the M function, S function and T function and outputs them to the machine tool from an I/O unit 17. Magnets and the like on the machine tool side are driven and further the hydraulic valves, pneumatic valves, electric actuators and the like are actuated in response to the signals. In addition, the PMC 16 receives signals from the limit switches and the switches on the machine control panel on the machine tool side, processes them as necessary and supplies the same to the processor 11.

A graphic control circuit 18 converts the digital data such as a present position of each axis, alarm, parameters, image data and the like into an image signal and outputs the same. The image signal is supplied to a display unit 26 of a CRT/MDI unit 25 and displayed thereon. An interface 19 receives data from a keyboard 27 in the CRT/MDI unit 25 and supplies the same to the processor 11. An interface 20 is connected to a manual pulse generator 32 and receives a pulse therefrom. The manual pulse generator 32 is mounted to the machine control panel and used to accurately position the moving parts of the machine tool by hand.

Axis control circuits 41–44 receive moving commands to the respective axes from the processor 11 and outputs them to servo amplifiers 51–54. On receiving the moving commands, the servo amplifiers 51–54 drive servo motors 61–64 of the respective axes. The servo motor 61 controls an X-axis, the servo motor 62 controls a Y-axis, the servo motor 63 controls the Z-axis, and the servo motor 64 controls a U-axis, respectively. Each of the servo motors 61–64 incorporates a position detecting pulse coder and a position signal is fed back from the pulse coder as a pulse train. A linear scale may be used as the position detector in some cases. Further, a speed signal can be created by subjecting the pulse train to an F/V (frequency/velocity) conversion. In the figure, a feedback line of the position signal and a feedback of speed are omitted.

A spindle control circuit 71 receives commands such as a spindle rotation command, spindle orientation command and the like and outputs a spindle speed signal to a spindle amplifier 72. On receiving the spindle speed signal, the spindle amplifier 72 rotates a spindle motor 73 at a commanded rotational speed. Further, the spindle amplifier 72 positions the spindle at a given position in response to the orientation command. As described above, the spindle 70 of the spindle motor 73 is provided with the male thread 700.

A position coder 82 is connected to the spindle motor 73 through a gear or belt. Therefore, the position coder 82 is rotated in synchronism with the spindle motor 73 and outputs a feedback pulse which is read by the processor 11 through an interface 81. The feedback pulse is used to move the other axes in synchronism with the spindle motor 73 and to carry out operations such as a threading operation and the like. Note, the position coder is used to feed back a position in a screw operation.

As described above, in the present invention, when a pipe having threads with a different pitch on the outside and inside thereof is screwed into an object and assembled thereto, a spindle is operated and screwed in accordance with the pitch of the thread on the outside of the pipe in a screw operation and relieved by being operated in accordance with the pith of the thread on the inside of the pipe in a relief operation. With this feed operation and relief operation of the spindle, the pipe is engaged with the object and assembled thereto. More specifically, the pipe having the threads with the different pitch on the outside and inside thereof can be assembled to the object by using a CNC machine tool. As a result, a screw and assemble operation conventionally carried out by using a dedicated machine can be performed by the CNC machine tool by which an operation process can be automatically carried out. Further, an operation efficiency can be improved.

We claim:

1. A method of automatically screwing a pipe into a threaded bore of an object, said threaded bore having a desired diameter for tightly fitting said pipe therein, the method comprising the steps of, sequentially:

providing a pipe having threads on both inner and outer surfaces, wherein said thread on the inner surface has a different pitch from said thread on the outer surface, said pipe having an outer diameter substantially equal to the diameter of said threaded bore;

mounting said pipe on a spindle by screwing said spindle into said pipe via said thread on the inner surface of said pipe;

transferring said spindle having said pipe mounted thereon to an assembling station and aligning said pipe in an axially direction with said threaded bore of said object;

screwing said pipe into said threaded bore of the object by simultaneously rotating and feeding said spindle, in said axially direction, in accordance with the pitch of said thread on the outer surface of said pipe; wherein said threaded bore having the same pitch as of said thread on the outer surface of said pipe; and relieving said spindle from said pipe by reversely rotating and simultaneously retreating said spindle, oppositely to said axially direction, in accordance with the pitch of said thread on the inner surface of said pipe and leaving said pipe secured to the object.

2. A method as recited in claim 1, wherein said step of screwing said pipe into said threaded bore comprises:

setting a screw feed speed in accordance with the pitch of said thread on the outer surface of the pipe and a spindle RPM;

setting an amount of screw feed movement for screwing said pipe; and screwing said pipe into said threaded bore in accordance with the set screw feed speed and the set amount of screw feed movement.

3. A method as recited in claim 2, wherein said step of relieving said spindle from said pipe comprises:

setting a relief feed speed in accordance with the pitch of said thread on the inner surface of the pipe and a spindle RPM;

setting an amount of relief feed movement for relieving said spindle; and relieving said spindle from said pipe in accordance with the set relief feed speed and the set amount of relief feed movement.

4. A method of automatically screwing a pipe over a threaded cylindrical core portion exposed from an object, said cylindrical core portion having a predetermined diameter for receiving said pipe thereon, the method comprising the steps of, sequentially:

providing a pipe having threads on both inner and outer surfaces, wherein said thread on the inner surface has a different pitch from said thread on the outer surface, said pipe having an inner diameter substantially equal to the diameter of said cylindrical core portion;

mounting said pipe on a spindle by screwing said spindle over said pipe via said thread on the outer surface of said pipe;

transferring said spindle having said pipe mounted thereon to an assembling station and aligning said pipe in an axially direction with said cylindrical core portion of said object;

screwing said pipe over said threaded cylindrical core portion of the object by simultaneously rotating and feeding said spindle, in said axially direction, in accordance with the pitch of said thread on the inner surface of said pipe; wherein said threaded cylindrical core portion having the same pitch as of said thread on the inner surface of said pipe; and relieving said spindle from said pipe by reversely rotating and simultaneously retreating said spindle, oppositely to said axially direction, in accordance with the pitch of said thread on the outer surface of said pipe and leaving said pipe secured to the object.

5. A method as recited in claim 4, wherein said step of screwing said pipe over said threaded cylindrical core portion comprises:

setting a screw feed speed in accordance with the pitch of said thread on the inner surface of the pipe and a spindle RPM;

setting an amount of screw feed movement for screwing said pipe; and screwing said pipe over said threaded cylindrical core portion in accordance with the set screw feed speed and the set amount of screw feed movement.

6. A method as recited in claim 5, wherein said step of relieving said spindle from said pipe comprises:

setting a relief feed speed in accordance with the pitch of said thread on the outer surface of the pipe and a spindle RPM;

setting an amount of relief feed movement for relieving said spindle; and relieving said spindle from said pipe in accordance with the set relief feed speed and the set amount of relief feed movement.

\* \* \* \* \*

UNITED STATES PATENT AND TRADEMARK OFFICE
CERTIFICATE OF CORRECTION

PATENT NO. : 5,539,972
DATED : July 30, 1996
INVENTOR(S) : Takao SASAKI et al.

It is certified that error appears in the above-indentified patent and that said Letters Patent is hereby corrected as shown below:

```
Title page, item [30];
            "4-048675" should be --04-48675--.
```

Column 1, line 21, "taping" should be --tapping--.

Column 2, line 33, after "screw" insert --method--.

Figure 6:
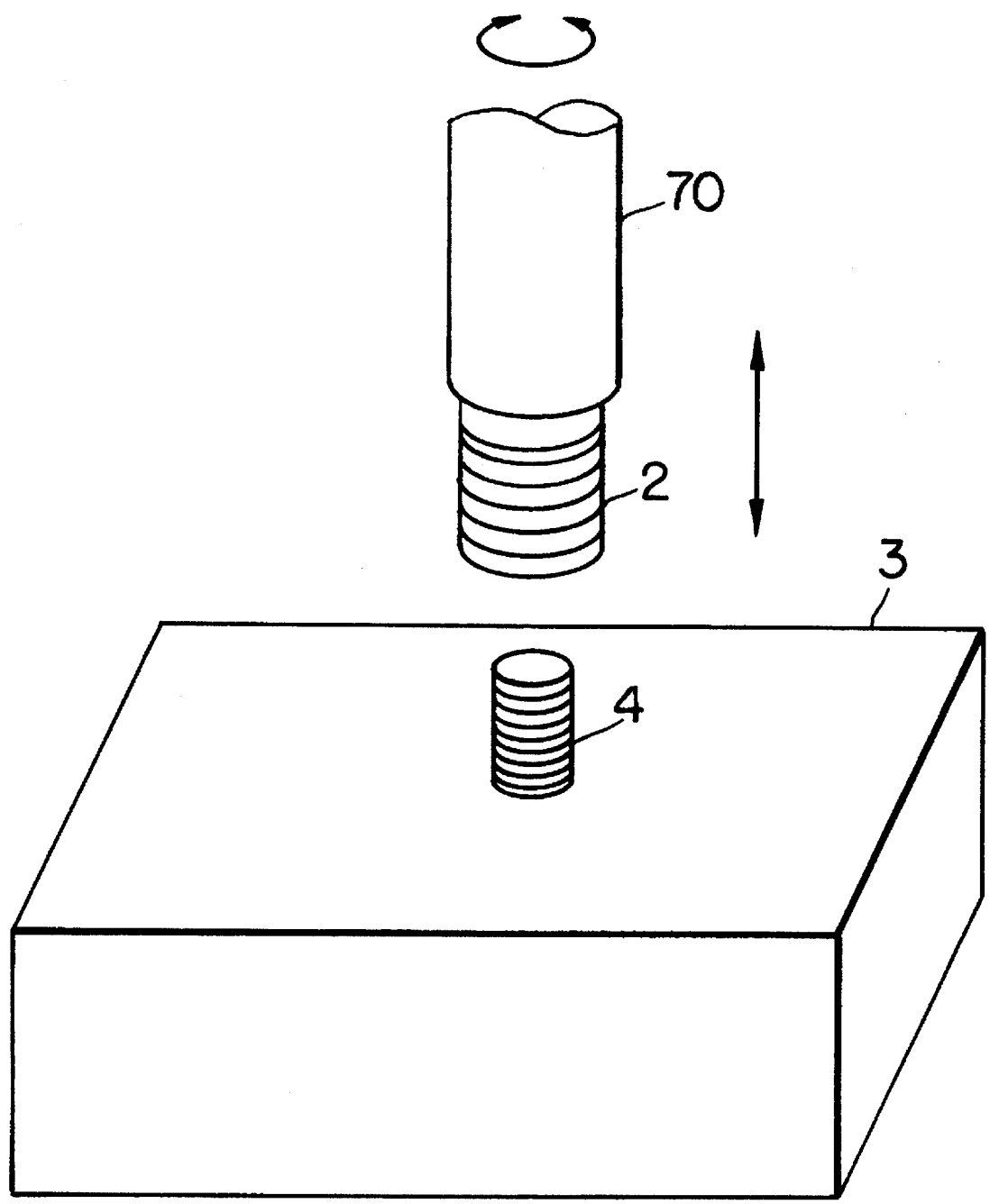
FIG. 6 is a diagram explaining an operation for screwing and assembling a pipe according to a preferred embodiment of the present invention.

Column 4, line 54, after "case" insert --shown in FIG. 6,--.

Signed and Sealed this

Nineteenth Day of November, 1996

Attest:

BRUCE LEHMAN

*Attesting Officer*       *Commissioner of Patents and Trademarks*